UNITED STATES PATENT OFFICE.

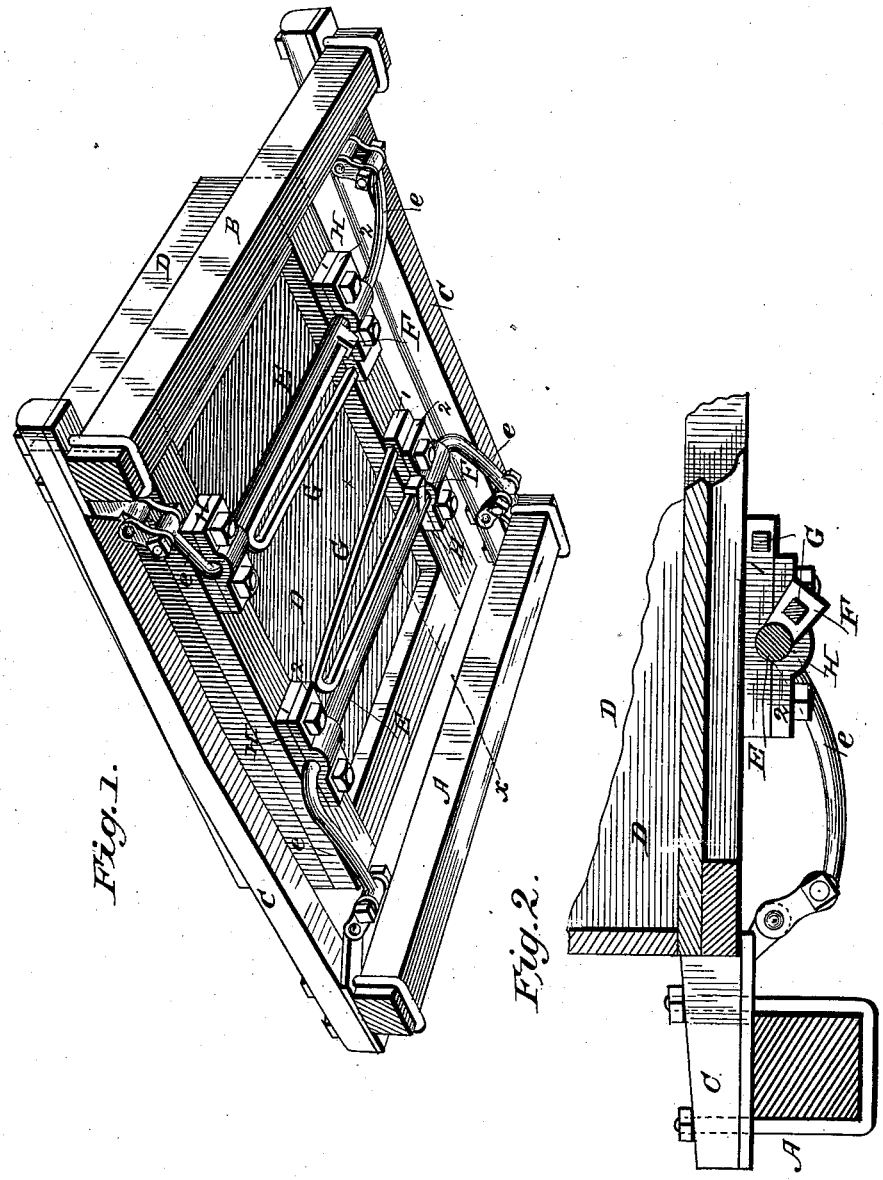

EDWIN JARRELL, OF HARPER, KANSAS.

VEHICLE-SPRING.

SPECIFICATION forming part of Letters Patent No. 379,168, dated March 6, 1888.

Application filed October 13, 1887. Serial No. 252,267. (No model.)

*To all whom it may concern:*

Be it known that I, EDWIN JARRELL, of Harper, in the county of Harper and State of Kansas, have invented a new and useful Improvement in Vehicle-Springs, of which the following is a specification.

This invention is an improvement in vehicle-springs; and the invention consists in certain features of construction and novel combinations of parts, as will be hereinafter described and claimed.

In the drawings, Figure 1 is a perspective view of the improvement inverted; and Fig. 2 is a detached sectional view on line $xx$, Fig. 1.

The head block, A, rear axle, B, side bars, C, and body D may be of ordinary construction. The shafts E are journaled to the body and have at their ends crank-arms $e$, which are shackled to the side bars or to the running-gear frame of which said side bars form a part. These shafts also have radial lugs or arms F, preferably arranged close to one end of the shafts. To these arms or lugs are connected rigidly one end of a spring-bar, G, the opposite end of which is fixed rigidly with reference to the body. It is preferred to form the bar G double-armed and U shape, as shown, one of the free ends of said bar being fixed to the arm or lug of the shaft, and the opposite end being fixed to the body—that is to say, with reference to the body, as it may be fixed directly to the body or to other parts, which in turn are fixed to the body.

It will be understood that the lugs or arms F form simply radial or eccentric projections on the shafts, and it is preferred to connect the spring-bars with such lugs or arms by forming the latter with angular or non-circular sockets to receive the correspondingly-formed ends of the bars.

In journaling the shafts to the body it is preferred to provide boxes H, fixed to said body and consisting of upper and lower sections, 1 and 2, having between them bearings for the shafts, the plates 1 being provided with non-circular sockets to receive the ends of the spring-bars.

It will be seen that the invention is very simple, and by it I utilize not only the tension of the spring-bars incident to the deflection thereof from normal lines, but also the torsional tension of said bars. By utilizing the combined action or force of these two tensions the parts are capable of about double the movement they would otherwise have without breaking the springs. The construction shown also serves to prevent the body from rocking sidewise.

It will be seen that by making the spring U-shaped, as shown, any desired length of spring may be utilized.

The spring-bars, as shown most clearly in Fig. 1, are extended in approximately the direction of length of the shafts, being secured at one end to the shafts off the axial centers thereof, preferably through the aid of the lugs or projections, and connected at their other ends with the body.

Having thus described my invention, what I claim as new is—

1. The combination, with the vehicle-body, of the boxes or brackets attached to the under side thereof and having circular bearings and non-circular openings or sockets, the torsion-springs secured at one end in said non-circular sockets, and the shafts journaled in the bearings of the boxes and connected with the torsion-springs, substantially as and for the purposes specified.

2. The improvement in springs herein described, consisting of the shaft having a radial arm or projection, a boxing in which said shaft is journaled, and a spring-bar fixed at one end to the boxing and at its other end to the lug or projection on the shaft.

3. The combination of the vehicle-body, the brackets or boxes secured thereto and arranged in pairs, all the brackets having shaft-bearings, and one bracket of each pair having a non-circular socket, the shaft journaled in said brackets and having a lug or projection, and the torsion-spring bar held at one end in the non-circular socket and having its other end connected with the projection on the shaft, all substantially as and for the purposes specified.

EDWIN JARRELL.

Witnesses:
H. W. MCMUNN,
ANDREW N. DAVIS.